May 4, 1926.
A. W. ARNOLD
VEHICLE TRUCK
Filed March 7, 1922
1,583,241
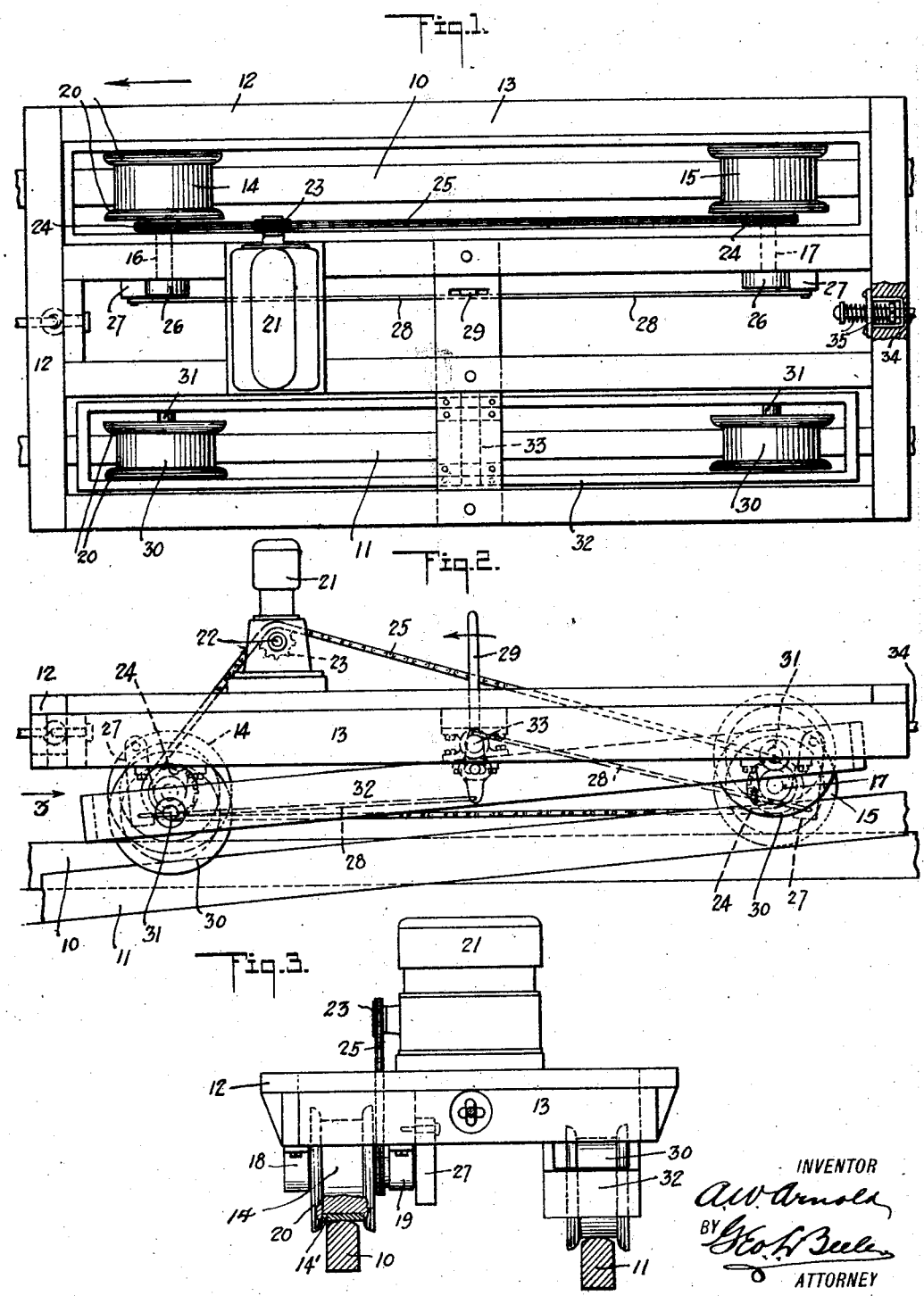

Patented May 4, 1926.

1,583,241

UNITED STATES PATENT OFFICE.

ARTHUR W. ARNOLD, OF LAPINE, OREGON.

VEHICLE TRUCK.

Application filed March 7, 1922. Serial No. 541,719.

*To all whom it may concern:*

Be it known that I, ARTHUR W. ARNOLD, a citizen of the United States, residing at Lapine, in the county of Deschutes and State of Oregon, have invented certain new and useful Improvements in Vehicle Trucks, of which the following is a specification.

This invention relates to vehicle trucks, and has particular reference to the formation of a truck frame which will automatically adjust itself to or absorb irregularities in the road without cramping, twisting, or racking the frame or body of the car.

While the invention is applicable for the use of a vehicle on any kind of a road, it is designed particularly for use in connection with railways built with rails of softer material than metal, such as poles of wood cut directly from the timber and which accordingly are subject to certain natural irregularities in form as well as diameter, causing the road bed to have certain irregularities both in track level and gauge.

Among the objects therefore of the invention is to provide a vehicle load support or frame so designed as to absorb all reasonable irregularities in the road level or gauge, while the structure may be driven through a plurality of traction wheels, the axles of which have a definite fixed relation to the power producing and transmitting devices and which will always act to drive the vehicle irrespective of the irregularities aforesaid or the taking of curves in the track.

Another object of the invention is to provide a truck or frame construction supported upon at least three wheels, two of which are on the same side and, rolling upon a single rail, are both positively driven from the same power mechanism for traction purposes, while the wheel or wheels on the opposite rail may be termed idlers, whereby it is unnecessary to provide differentials or divided alined axles or any universal joints or their equivalent between the motor shaft and the power transmitting mechanism.

More specifically, in carrying out the foregoing objects, I provide a load support or rigid fixed frame in which are journaled a plurality of traction wheels to roll upon a single rail beneath one side of the load support and which are driven directly from the power mechanism, while on the opposite side is arranged an auxiliary frame so mounted in the load support or below it as to have facility of rocking in a vertical plane around a transverse horizontal axis and in which auxiliary frame are journaled idler wheels for the other side of the road support.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of the vehicle truck indicating the principal features of my improvement.

Fig. 2 is a side elevation of the same.

Fig. 3 is a front elevation as seen from the arrow 3, Fig. 2, and with one of the wheels broken to indicate the tire construction.

As above premised this device is calculated for co-operation with a pair of rails 10 and 11 which may be irregular in gauge or level, the rail 11 being indicated in exaggerated degree materially out of level with respect to the rail 10 and thereby showing the direct action of the auxiliary frame.

12 indicates a main body or frame, termed hereinafter broadly a load support. Within or below one side of this load support, as within a relatively rigid frame 13, are front and rear traction wheels 14 and 15 mounted upon parallel transverse axes represented by axles 16 and 17, respectively, journaled in bearings 18 and 19 of any suitable nature adapted to restrict the axles from endwise movement with respect to the load support. Each of these wheels is shown provided with flanges 20 on both sides to insure that the same will remain upon the rail 10 and follow this rail irrespective of any irregularities therein.

Any suitable power means may be employed for driving the vehicle. For this purpose I show an engine 21 having a drive shaft 22 arranged transversely of the vehicle and to which is attached a sprocket wheel 23 substantially in the vertical plane of two driving sprocket wheels 24 fixed to the respective axles 16 and 17. A sprocket chain 25 operating over these sprocket wheels transmits the power from the engine to the axles and traction wheels. Since the load support as thus far specified is rigid and the axles of the traction wheels are journaled therein for rotation in fixed bearings, and also that the power mechanism is supported in fixed relation to the load support, the traction wheels will always operate in fixed relation with the load support. In other words, irrespective of any irregularities in the rail 10, the wheels 14 and 15 will follow the same, either up or down or laterally, and the load support and load thereon will follow the wheels along such irregularities without any cramping or twisting.

I show the axles 16 and 17 extended so as to receive brake wheels 26 on at least one of them, and co-operating with each brake wheel is a brake shoe 27 of any suitable construction. These brake shoes are indicated as having rods 28 extending from them to a brake lever 29, which when moved in the direction of the arrow on Fig. 2 will compel the brake shoes to grip the wheels 26. It will of course be understood that while the illustration of this device is somewhat diagrammatic in nature the novel features are fairly illustrated, and in practice the design or arrangement of the several parts may appear specifically different from the structure illustrated but without departing essentially from the real invention.

Rolling upon the rail 11 are idler wheels 30, shown as two in number and journaled loosely upon axles 31 mounted transversely across or within an auxiliary frame 32 adapted to rock with respect to the load support around a transverse pivot 33 shown above the rail 11 and hence on or below the side of the load support remote from the power mechanism above described. The wheels 30 may be constructed substantially the same as the traction wheels and for use on wooden or pole rails all are preferably provided with rubber treads 14' so as to increase the grip on the rails and prolong the wearing qualities of the rails. These wheels 30 also are provided with flanges 20 on both sides to compel the wheels to remain on the rail. The axles 31 are enough longer than the width of the wheels within the frame 32 to allow the wheels to play laterally along their axles with respect to the auxiliary frame and load support to absorb irregularities in the rail 11 and without compelling any material amount of movement in the load support because of such irregularities in the rail 11. As indicated, if the rail 11 has irregularities vertically, causing departure from the road level with respect to the rail 10, the rocking frame 32 has simply to rock in a vertical plane around the transverse pivot 33 while the load support and its load follow the road level as to the rail 10, but while the load support may be following irregularities in road level as before described incident to the irregularities in the rail 10, the rocking frame will allow such rocking of the load support irrespective of any condition of the rail 11 as to irregularities therein in any direction. In other words, the supporting and traction wheels as set forth take care of all irregularities in either gauge or road level of the rails without any possibility of cramping the load support or its load carried thereon, and thus furthermore the traction of the vehicle is assured irrespective of any such irregularities or lateral curvatures in the track even though the power mechanism is directly connected to more than one traction wheel.

At 34 I indicate a drawbar floating or reciprocating between springs 35 and having a link connection to couple with the next car and thus permit free movement in all directions for this extension, and still the plunger or drawer itself has but little if any side motion.

From the foregoing it will be apparent that while the road may be built of any such materials having a hard surface such as cement, the construction is designed especially to operate on rails that may be of wood in the form of native poles or sawed or hewn timbers and of such a nature that the rails would not endure under usual car structures having wheels with metal treads. Thus it will be clear why the truck described herein is particularly effective, having the capability of adaptability to uneven road surface both as to the track level and gauge. It will be appreciated that in a cheaply built railway, especially when built by workmen unskilled in railway work, and when built of only poles for rails there naturally will be considerable variations in the size, shape, and gauge of the rails as well as in the variation in the level and grade of the road, so that the rails are liable to be either tapered, crooked, or otherwise offshaped.

The effectiveness in this vehicle structure depends upon its simple and yet extremely extensive absorbing power for such varied road conditions. This structure relates to both locomotive (self-propelling) vehicles and to one of many trailers. Its capacity for moving tonnage economically is the ability to haul a long train behind the one unit of power, which (contrary to auto truck equipment which is limited to about one trailer) is automatically guided by the rails without other guiding mechanism than the rails themselves.

The great merits of this construction depend mainly upon two features, namely, the wheel structure, and the car frame structure.

It will be seen that to accomplish the objects above set forth, a railroad wheel must consist of a tread of cushion material for the purpose of furnishing great traction, ease of movement, and speed, and to prevent rapid wear of the fragile rails. Also at the same time the tread of the wheel is gripping the surface of the rail, either one or the other of the two guiding flanges of the wheel may be required to slip on the side of the rail for the purpose of following both straight and curved track. Therefore, the wheel for best service should be so constructed that its tread is a cushion and its flanges are of a harder material, one or the other of the flanges to be removable to permit of replacing tires when worn out. Much of the traction depends upon adhesion of materials of different density instead of like the ordinary railroad traction, being through application of much weight to compel traction between materials of about the same density.

Noting again the arrangement or relation between the truck and the rails in Fig. 1, wherein the frame is rigid and both axles 16 and 17 are journaled in fixed parallel relation to each other and at 90° from the length of the frame and also that the wheels are coupled positively together through the chain 25 for simultaneous rotation, I wish to emphasize the importance of the rubber treads 14' for the additional reason that because of the resilient nature of the tires or treads the wheels coupled as indicated possess the capability of taking easy curves without any slippage or cramping whatever. This statement will be understood if, for example, the frame be given a twist around the vertical center while the car is standing still. If this twist be in a clockwise direction, for instance, the wheel 14 will be swung to the right of its contact point with the rail. That is to say all parts of the wheel 14 will move with the front end of the frame toward the right, this movement being limited by the flange 20 adjacent to the chain, while the wheel 15 will likewise move bodily with the rear end of the frame toward the opposite rail, the portion of each tire in contact with the rail 10 remaining in fixed position. If now the car be in motion the same lateral or side spring or bend of the tire of each traction wheel will obtain just the same as when the frame was considered to be given a twist around a vertical axis, and while the car is moving and the wheels are rolling the laterally bent portion of each tire will progress according to the rotation of the wheel, always without slippage or cramping, and so the car may make curves within reasonable limits without either slippage, cramping, or loss of traction power due to the fact that the tires are resilient and may bend or spring laterally. This condition is true, moreover, irrespective of the particular manner in which the wheels may be coupled together for simultaneous rotation.

The car frame structure is so designed that it co-operates with the wheel structure in absorbing variations of gauge of rails, in absorbing curvature of road (differential feature); in permitting each and every wheel to follow freely and independently high and low points in road level or road surface (accomplished without the use of expensive springs and without independent individual wheel bearing floating on springs free of car structure); in providing for simple application of effective brakes, without interfering with ease of movement and flexibility of car for gauge or for high and low points; in providing floating drawbars, for push and pull (so arranged that the locomotive and the cars may have the advantage in starting a load as do standard locomotives, and also permitting the free movement of the ends of the car without touching and interfering with such free action of the floating drawbar), and in providing for application of motive power to one or more drivers and still not interfere with the free action of all other features of car and wheel structure, this motive power being steadily applied to such driver or drivers constantly being held in true line with same, regardless of irregular motion of wheels and frame during their free movements in following road gauge and level.

I claim:

1. In a vehicle, a rigid load support, a plurality of wheels on one side thereof and having a fixed relation to the load support, means to positively drive in unison both of said wheels whereby they are constituted traction wheels, and rolling supporting means for the other side of the load support having connections with movable relation to the load support.

2. In a vehicle, the combination of a load support, two supporting wheels therefor on each side thereof, and unitary power means to drive simultaneously both wheels on one side, while the wheels on the other side are idlers.

3. Mechanism as set forth in claim 2 in which two of the wheels are mounted on axles having fixed relation to the load support while the other two wheels have movable relation to the load support.

4. Mechanism as set forth in claim 2 in which the two wheels on one side of the load support have fixed relation and are positively driven from a single source of power.

5. In a vehicle, the combination of a rigid load support, a pair of wheels mounted on transverse parallel axes on one side of the load support, said axes having fixed relation thereto, power producing and transmitting means connected directly to said wheels for driving them in unison, a frame movably connected with the other side of the load support, and a pair of wheels journaled in said movable frame, substantially as set forth.

6. In a vehicle, the combination of a rigid load support, a pair of wheels journaled in one side thereof and having fixed relation thereto, a frame movably attached to the other side of the load support, and a pair of wheels journaled in said movable frame, said latter mentioned wheels being movable up and down and laterally with respect to the load support.

7. Mechanism as set forth in claim 6 in which the latter mentioned wheels are journaled for movement laterally with respect to the movable frame in which they are journaled.

8. The herein described railway truck comprising a rigid load support, a pair of traction wheels for one rail journaled in one side of the load support and having fixed relation thereto, a pair of idler wheels for the other side of the load support and having movable relation thereto and adapted for rolling on the other rail, and means for driving the first mentioned wheels simultaneously at the same speed.

9. Mechanism as set forth in claim 8 in which brake means is provided for the traction wheels on the same side of the truck.

10. In a vehicle, a rigid load support, a plurality of wheels at one side thereof having substantially fixed relation to the load support, a plurality of wheels at the other side having movable relation to the load support, and pivoted means to cause the latter wheels to move in opposite vertical directions relatively to each other.

11. In a vehicle, a rigid load support, a plurality of wheels on one side thereof having substantially fixed relation to the load support, and rolling supporting means for the other side of the load support, the forward portion of said rolling supporting means being movable in the opposite direction relatively to the rear portion thereof.

In testimony whereof I affix my signature.

ARTHUR W. ARNOLD.